United States Patent Office.

G. F. J. COLBURN, OF NEWARK, NEW JERSEY.

Letters Patent No. 67,025, dated July 23, 1867.

---

COMPOSITION FOR DENTAL PLATE.

---

*The Schedule referred to in these Letters Patent and making part of the same.*

---

TO ALL WHOM IT MAY CONCERN:

Be it known that I, G. F. J. COLBURN, of Newark, in the county of Essex, and State of New Jersey, have invented a new and improved Composition-Plate for Artificial Teeth; and I do hereby declare that the following is a full, clear, and exact description thereof, which will enable others skilled in the art to make and use the same.

This invention relates to a new and improved composition for the plates in which artificial teeth or teeth and gums are set.

The object of the invention is to obtain a composition for the purpose specified which will admit of being manufactured or moulded into the desired form, and the teeth, or teeth and gums, set into it with far greater facility than hitherto, and which will also possess the advantage of admitting of repairs being made (broken teeth replaced) with far less difficulty than with either the metallic (gold) plate or with the hard-rubber or vulcanite plate.

The basis of my improved composition consists of gum-shellac mixed with a substance which will deprive it of its frangibility and give the requisite degree of toughness. In the course of my experience I have found asbestos to answer this purpose in an eminent degree.

The following are the ingredients of my improved composition, which I have used with perfect success: No. 1, gum-shellac, one ounce; No. 2, asbestos, seven pennyweights; No. 3, oxide of zinc, six pennyweights; No. 4, sulphur, one pennyweight six grains; No. 5, chalk, one pennyweight. These ingredients are put into a mortar and pulverized, and then fused or melted together.

The composition thus formed may be softened by heat and moulded into plates to suit the mouth, in substantially the same way as is practised to form the hard-rubber plates, and the teeth or teeth and gums may be secured in the plate by means of pins, in the same manner as teeth are secured in the hard-rubber plates.

My invention simply requires to be moulded into the proper form; no after-heating or baking is required, as in using the vulcanite or hard-rubber plates, and in case a tooth be broken from the plate, a new one can be inserted in it and united by fusion at a comparatively low temperature, whereas with the vulcanite or hard-rubber plates they require, after a new tooth is inserted in them, to be subjected to a high heat in a retort, in order to unite the parts by fusion, as the vulcanite fuses only at a high temperature, and the process occupies about three hours.

My composition is not affected by any acids to which it may be subjected in the mouth. It has been thoroughly tested in this respect. Sulphuric acid will not even destroy its lustre. It is insoluble in water, and extremely tough and strong, similar to the vulcanite or hard rubber, while the natural shade of gum or flesh color may be given it without any difficulty whatever.

Having thus described my invention, what I claim as new, and desire to secure by Letters Patent, is—

A composition for the plates of artificial teeth, composed of the ingredients No. 1 and No. 2, with any suitable coloring substances, such as Nos. 3, 4, 5, substantially as set forth.

G. F. J. COLBURN.

Witnesses:
   WM. F. McNAMARA,
   ALEX. F. ROBERTS.